(12) United States Patent
Romas et al.

(10) Patent No.: US 9,457,722 B2
(45) Date of Patent: Oct. 4, 2016

(54) REAR VIEW MIRROR ASSEMBLY WITH ELECTRICAL SUB ASSEMBLY

(71) Applicant: SMR Patents S.a.r.l., Luxembourg (LU)

(72) Inventors: Vasile Romas, Esslingen (DE); Balazs Toth, Rabacsanak (HU)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 14/886,529

(22) Filed: Oct. 19, 2015

(65) Prior Publication Data

US 2016/0039344 A1    Feb. 11, 2016

Related U.S. Application Data

(63) Continuation of application No. 12/954,703, filed on Nov. 26, 2010, now abandoned.

(30) Foreign Application Priority Data

Nov. 26, 2009   (EP) ..................................... 09177256

(51) Int. Cl.
| | |
|---|---|
| *B60R 1/06* | (2006.01) |
| *B60R 1/12* | (2006.01) |
| *B60Q 1/26* | (2006.01) |

(52) U.S. Cl.
CPC ........... *B60R 1/1207* (2013.01); *B60Q 1/2665* (2013.01); *B60R 1/06* (2013.01); *Y10T 29/49002* (2015.01)

(58) Field of Classification Search
CPC ......... B60R 1/07; B60R 1/1207; B60R 1/06; B60Q 1/2665; B60Q 1/34; G02B 7/182
USPC .......................... 359/841, 871, 872; 362/494
See application file for complete search history.

(56) References Cited

U.S. PATENT DOCUMENTS

| | | | | |
|---|---|---|---|---|
| 4,646,210 A | * | 2/1987 | Skogler | B60Q 3/023 359/872 |
| 4,815,837 A | * | 3/1989 | Kikuchi | B60R 1/072 248/487 |
| 4,877,319 A | * | 10/1989 | Mittelhauser | B60R 1/076 248/549 |
| 5,178,448 A | * | 1/1993 | Adams | B60Q 3/0209 362/494 |
| 5,346,409 A | * | 9/1994 | Weiner | H01R 13/73 439/542 |
| 5,455,716 A | * | 10/1995 | Suman | B60R 1/04 248/479 |
| 5,889,624 A | * | 3/1999 | Dickenson | B60R 1/07 248/479 |
| 5,896,238 A | * | 4/1999 | Hubscher | B60R 1/07 310/71 |

(Continued)

FOREIGN PATENT DOCUMENTS

| | | |
|---|---|---|
| EP | 0873910 A2 | 10/1998 |
| EP | 1193806 A2 | 9/2001 |
| EP | 2045882 | 4/2009 |
| WO | 2005113291 A1 | 1/2005 |

OTHER PUBLICATIONS

EU Search Report for application No. EP09177256 dated May 27, 2010; 3 pp.

*Primary Examiner* — Ricky D Shafer
(74) *Attorney, Agent, or Firm* — Simonelli IP, PLLC

(57) ABSTRACT

The invention is related to a rear view mirror assembly that includes at least one electrical device as a light source with adapted connectors to be assembled in an easy way. The invention is related to an electrical device as a lighting mean in a rear view mirror that has a connector adapted to be self centric connected to the counterpart during assembling.

7 Claims, 6 Drawing Sheets

(56) References Cited

U.S. PATENT DOCUMENTS

| | | |
|---|---|---|
| 6,250,783 B1 | 6/2001 | Stidham et al. |
| 6,419,368 B1 * | 7/2002 | Guttenberger ............ B60R 1/07 359/872 |
| 6,499,992 B2 * | 12/2002 | Scheunpflug ...... H01R 13/6315 431/247 |
| 6,533,424 B2 | 3/2003 | Secanu |
| 6,650,457 B2 * | 11/2003 | Busscher ............. B60Q 1/2665 359/265 |
| 8,058,977 B2 * | 11/2011 | Lynam .................. B60R 1/1207 340/425.5 |
| 2011/0317296 A1 * | 12/2011 | Schmierer ................. B60R 1/07 359/871 |

* cited by examiner

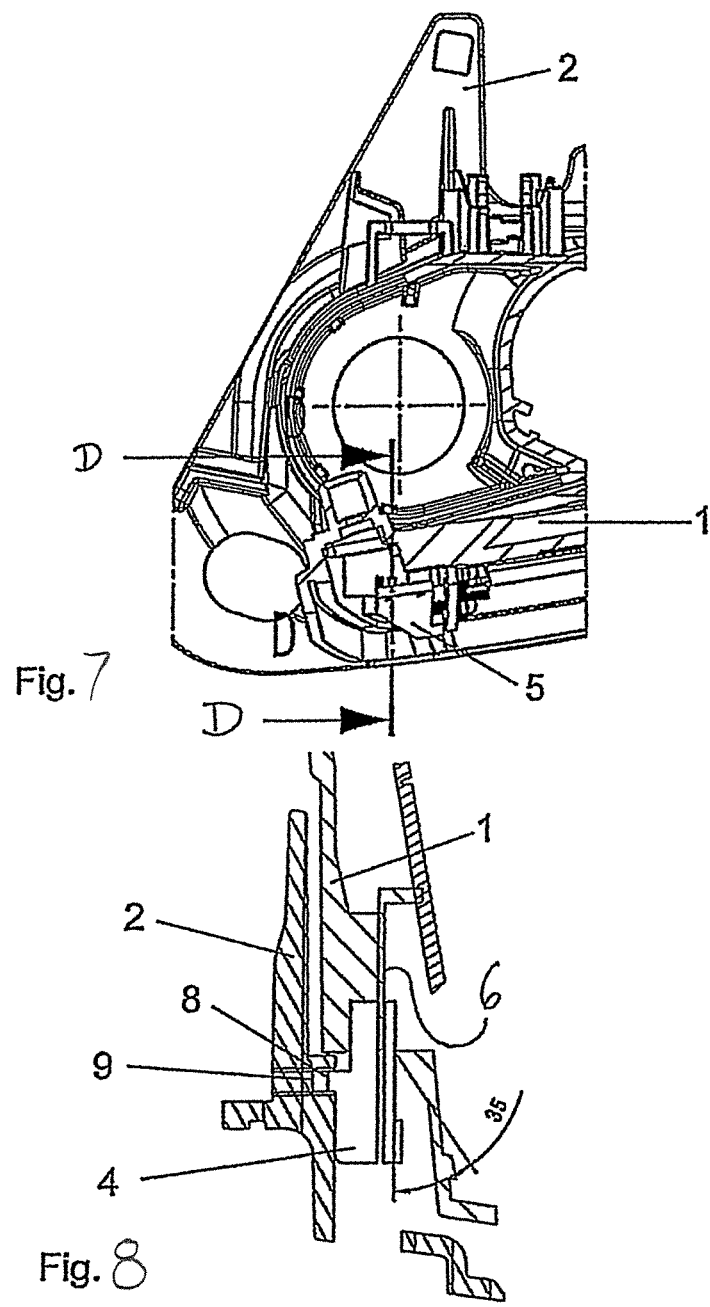

ized by full turn of the mirror support.

REAR VIEW MIRROR ASSEMBLY WITH ELECTRICAL SUB ASSEMBLY

This is a continuation of a United States patent application having application Ser. No. 12/954,703, filed Nov. 26, 2010, and claims priority to European patent application EP09177256.6, which is hereby incorporated by reference.

BACKGROUND ART

1. Field of the Invention

The invention is related to a rear view mirror assembly that includes at least one electrical device, for example a light source with adapted connectors to be assembled in an easy way.

More especially the invention is related to an electrical device as a lighting mean in a rear view mirror that has a connector adapted to be self centric connected to the counterpart during assembling.

2. Description of the Related Art

In automotive industries the cost pressure is high. Also for the supplier of rear view mirrors, there is a need to decrease costs and to ease assembly processes. The designs of the rear view mirror often includes electrical devices for lighting as turn signal indicators, security lights, day running lights, hazard alert indicators and further illumination means that must be connected electrically to the rear view mirror harness. Other electrical devices, such as IR illumination for sensors, day running light, sensors, antennas, cameras, actuators may also be installed and electrically connected to the vehicle electrical system. The location of the different electrical devices does often not allow an easy access and therefore an easy mounting of connectors.

It is clear that for quality reasons the electrical connection must be reliable and easy to handle during production.

EP0873910 discloses devices that facilitate rapid and low cost assembly of parts. In the embodiment of FIG. 5, a base member, light socket and connector are shown having a pair of electrically conductive pins extending outwardly therefrom. Mirror housing is also modified by replacing opening with a molded-in cavity in which a pair of spaced openings is provided positioned so as to receive pins when a decorative member is assembled thereto. Thus with this embodiment, the assembler need not first interconnect the two electrical connectors but rather needs merely install the decorative cover member during which pins will be received within openings thereby electrically connecting light assembly to the existing vehicle turn signal system.

The solution according prior art need a precise allocation of opening and pins.

The invention is to ease the connections between parts of a mirror and to provide a simple assembly process for the device.

SUMMARY OF THE INVENTION

The invention is show in the figures and described in the description as follows. As an example of an electrical device a turn signal indicator is shown in the figures.

BRIEF DESCRIPTION OF THE DRAWINGS

Advantages of the invention will be readily appreciated as the same becomes better understood by reference to the following detailed description when considered in connection with the accompanying drawings, wherein:

FIG. 7 shows a top view on mirror support along C-C; and

FIG. 8 shows a cross section along D-D.

A rear view mirror includes several parts, the mirror base that is fixed to the vehicle and the mirror head that has opening to host a mirror glass and electrical devices as light or sensors etc. The mirror head consists of a mirror support or backing plate that is pivotably connected to the mirror base. The housing covers can be a one-cover solution of several parts used to cover base and mirror support. In some designs, a bezel surrounds the mirror glass.

DETAILED DESCRIPTION OF THE PREFERRED EMBODIMENT

Figure 1:
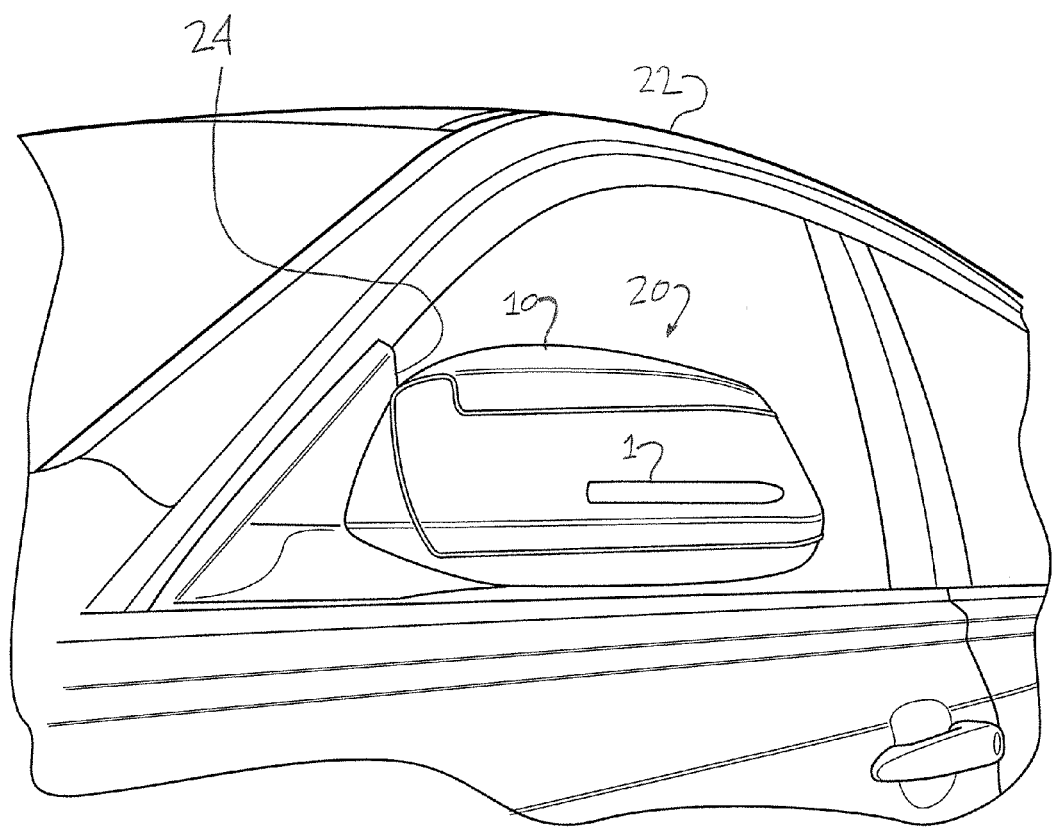
FIG. 1 is a perspective view of one embodiment of the invention attached to a motor vehicle, partially cut away.

Referring to FIG. 1, one embodiment of the inventive assembly is generally indicated at 20. The assembly 20 is a side mirror that is fixedly secured to a motor vehicle 22 via a mirror base, which is graphically represented by a sail 24. A housing cover 10 covers the forward facing portion of the assembly 20.

Figure 2:
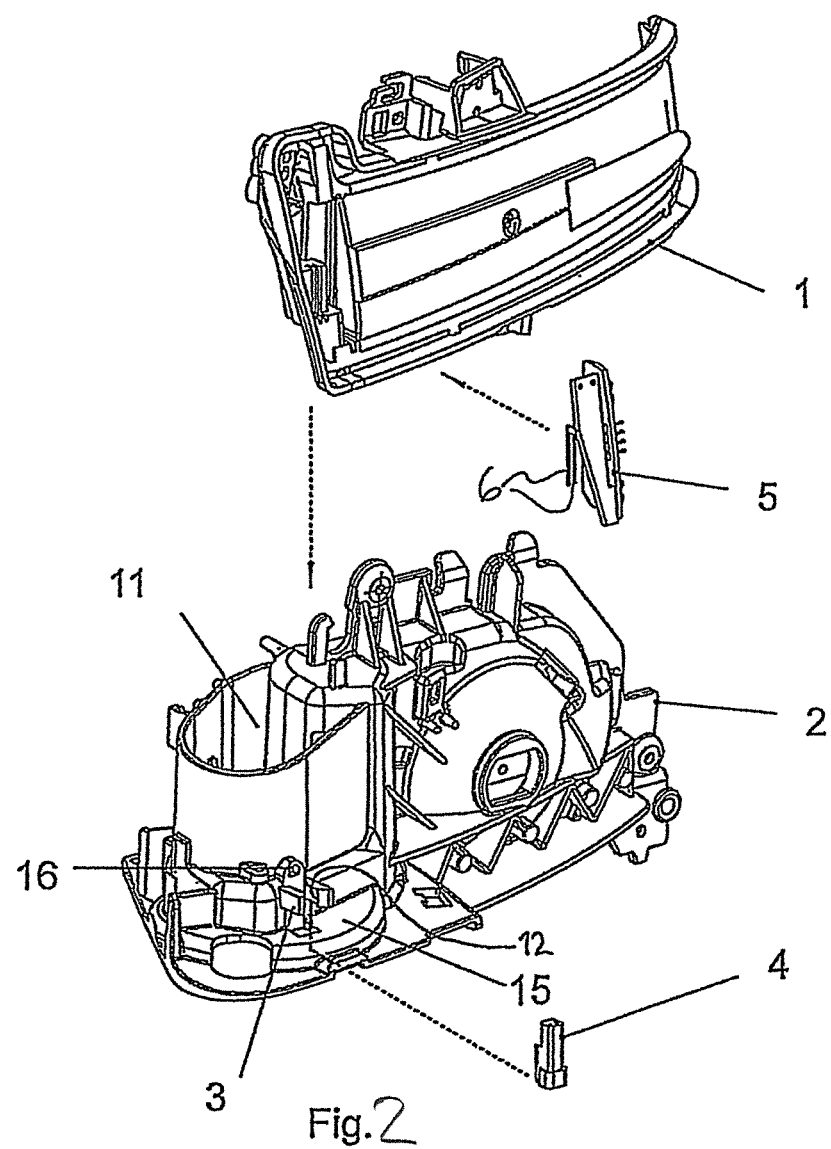
FIG. 2 shows a scheme of a turn signal indictor and a mirror support according the invention.

In FIG. 2, the assembly 10 is shown without the housing cover 10 secured thereto. A turn signal indicator module 1 is provided that includes a backside housing which can host a reflector mean and light sources, such as a light bulb or an LED.

The turn signal indicator 1 comprises a printed circuit board 5 that is equipped with electronic elements to drive the light sources and the means to connect the printed circuit board to the turn signal indicators module. In the embodiment the printed circuit board is equipped with a LED so that the light shines along a light guide that is covering the housing of the turn signal indicators. The light guiding lens is not shown in this figure.

The details of the turns signal indicator 1 are not important, but for the limitation that the turn signal indicator 1 is adapted to be connected with the inventive solution to the electrical connection.

The turn signal indicator 1 is electrically connected to a mirror support 2. The mirror support 2 is bearing the glass actuator and the mirror glass on one side. The mirror support 2 has an opening 11 for a power fold device and is pivotably installed at the mirror base 24 and the vehicle 22. On the other side—as visible in the drawing—the mirror support has an attachment 3 to install a connector 4. More specifically, the female connector 4 is clipped between two attachments 3 that are integrated into the structure of the mirror support 2 to guide and to hold the connector 4.

Figure 3:
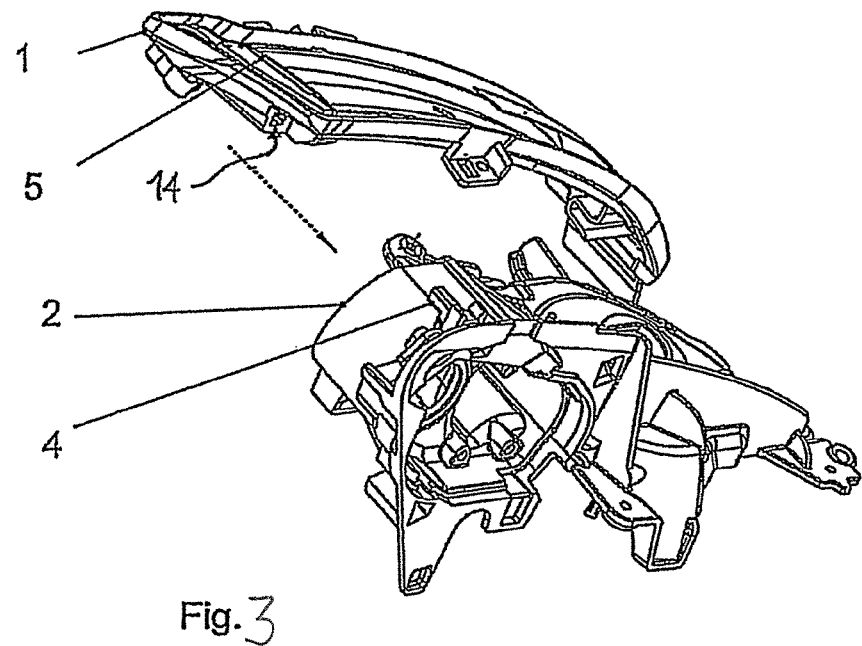
FIG. 3 shows the connection direction.

FIG. 3 shows the direction in which the two main devices, the turn signal indicator 1 and the mirror support 2, are electrically connected. The left part of the turn signal indicator 1 with the printed circuit board and the attachment 3 to connect is connected with the female connector 4.

In the assembly process the turn signal indicator 1 is implemented into the mirror housing or backside cover. The turns signal indicator 1 is either mounted reversible by using of mounting posts and screws or snap fit connectors or none reversible connected by welding the edges with the edges of the housing.

During the assembly process, the connector 4 is first clipped into the attachments 3 to fix the female part of the connector at the mirror support. Then, the mirror housing 10 together with the turn signal indicator 1 is mounted by directing a male connector part in form of connector pins 6 of the printed circuit board 5 into the female connector 4.

Figure 4:
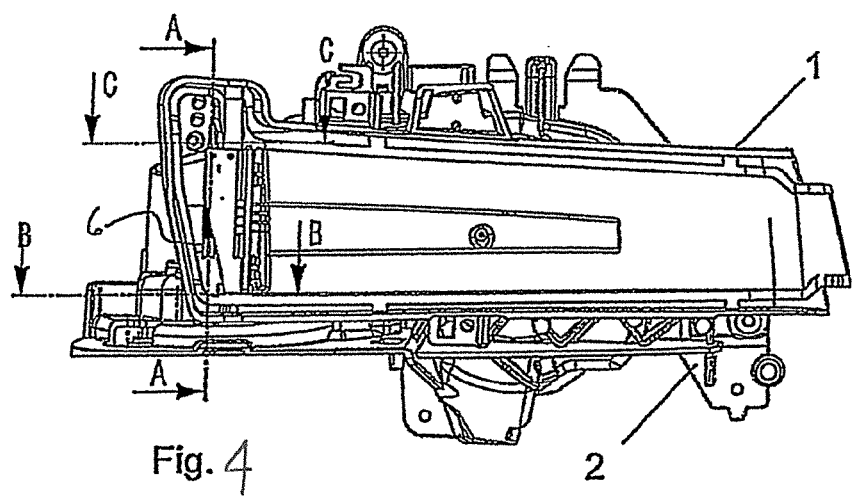
FIG. 4 shows a turn signal indicator module.

FIG. 4 shows a frontal view onto the turn signal indicator 1 which is installed on the mirror support 2. The axis A, B and C defines further cross sections.

Figure 5:
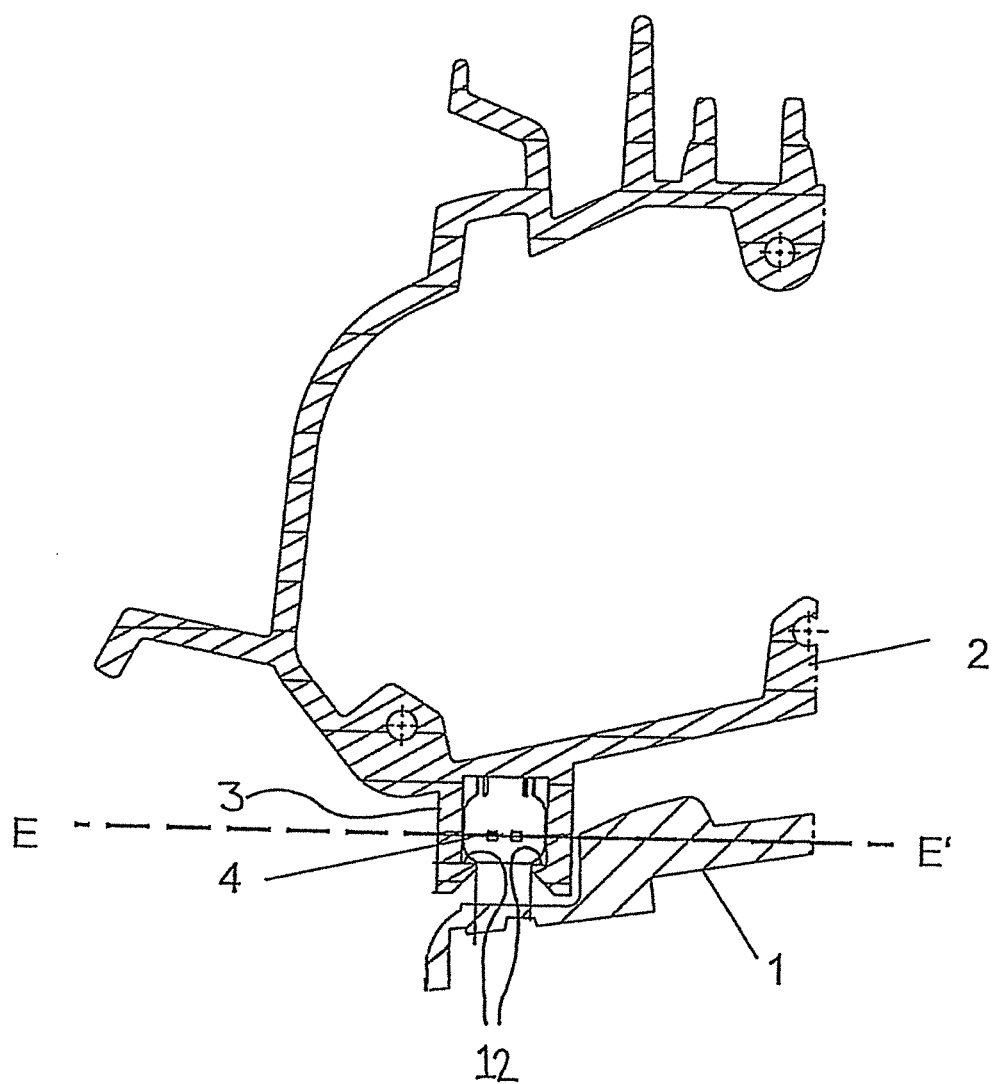
FIG. 5 shows a cross section along B-B.

FIG. 5 shows a cross section along the axis B-B of FIG. 4. The mirror support 2 has integrated attachments 3 that guide the connector 4. The attachments have legs related to the dimension of the connector 4. The legs have hooks 12 at the distal ends thereof and form a snap fit connection between the connector 4 and the mirror support. Because the legs of the attachment 3 are formed from plastic material, they are flexible to move when the connector is pressed in. The turn signal indicator housing 1 is shown in this figure adjacent to the mirror support 2.

Figure 6:
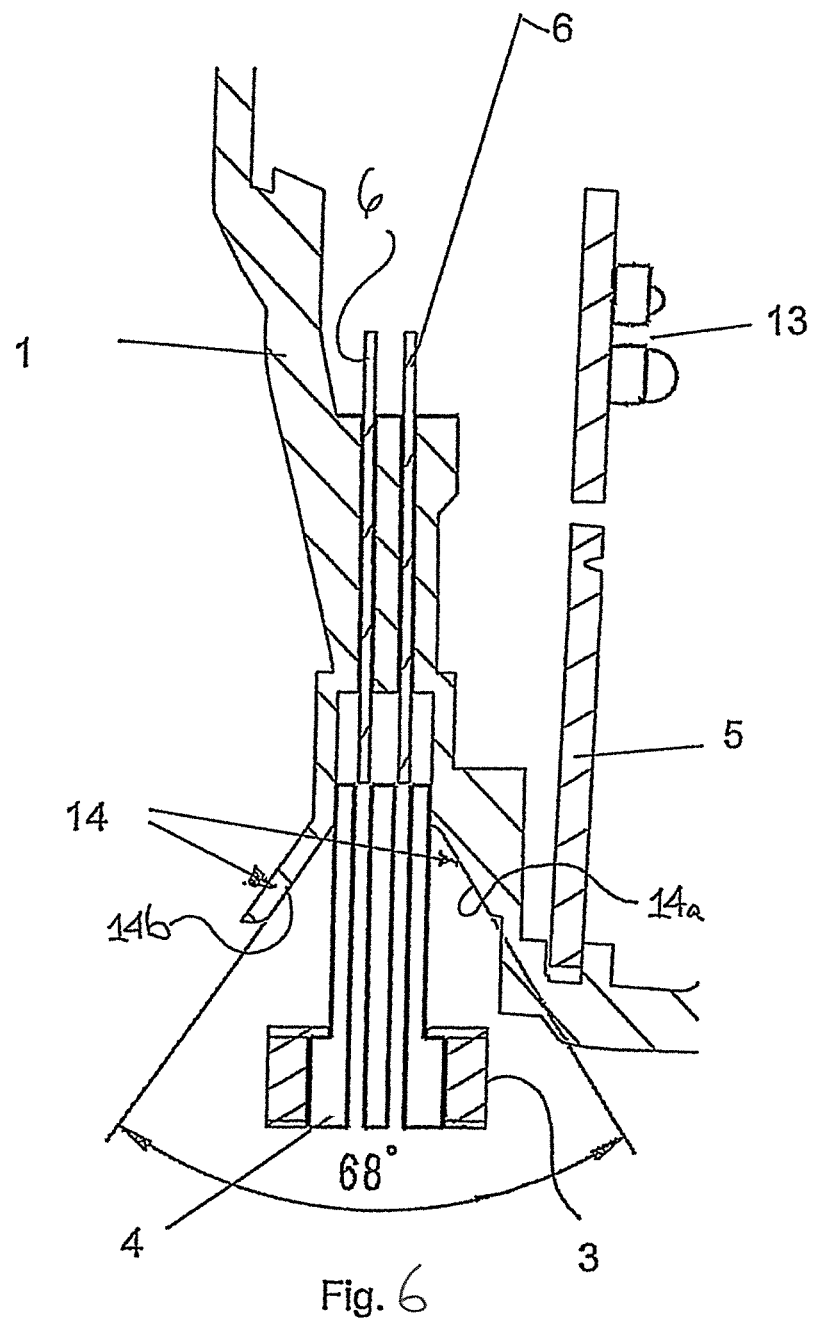
FIG. 6 shows a cross section along E-E.

FIG. 6 shows a cross section along the axis E-E of FIG. 5. The turn signal indicator housing 1 shows electrical pins 6 that are formed to pass through the housing. The turn signal indicator housing forms a conical structure 14 that surrounds the electrical pins 6. On the side, the housing adjacent to the printed circuit board 5 forms one face 14*a* of the conical structure and a leg 14*b* forms the outer face of the conical structure. The conical structure 14 has an angled opening of around 70°+/−3°. This conical structure 14 works as a guiding, self centric structure to ease the connection between pins and connector. As is best shown in FIG. 3, the conical structure 14 is flush with the electrical device 1 in that the conical structure 14 does not extend beyond the electrical device 1.

The electrical pins are not visible in this cross section-connected to the printed circuit board 5 on which the LED 13 is mounted.

FIG. 7 shows a top view of the mirror support with the turn signal indicator housing 1 on top.

FIG. 8 is a cross section along D-D of FIG. 7. The support 2 shows a recess 9 that fits to a lug 8 of the connector 4. The recess 9 is integrally formed at the backside 16 of the opening form between the attachments 3 for the connector 4. The connector is moved upwards towards the mirror support level 15 during assembly process.

The connector is shifted in direction of the support level 15 up to a position where the lug 8 snaps into the recess 9 in the backside of the mirror support.

The invention as described above is also useful if the electrical device is connected to another mounting support.

It is possible to use the integrated attachment of the invention with a mounting support that is a cover element of the rear view mirror assembly. In addition, the base cover, mirror base, or mirror bezels can be used as mounting support device with integrated attachment for a connector. During assembly, the electrical device as a sensor device is connected to the connector that is fixed in the mirror bezel.

The combination of mounting support devices and electrical devices is known. It is only important that the electrical device together with the mounting support device forms an electrical and mechanical guided subassembly. The invention allows the preparation of the electrical connection and a first mechanical connection between the devices. Mechanically the electrical device is fixed with pins in a connector that is guided in a conical structure. This mechanical guide is not used to permanently secure the electrical device 1 to the mirror support 2, but as a first mechanical connection until the subassembly is assembled to the other parts of the rear view mirror.

LEGEND

1 Turn Signal Indicator
2 Mirror Support
3 Attachment
4 Connector female
5 PCB
6 Connector Pins
8 Lug
9 Recess
10 Housing cover
11 Opening power fold
12 Hooks
13 LED
14 Conical structure
15 Mounting Support level
16 Backside of mounting support
20 mirror assembly
22 motor vehicle
24 mirror base The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A rear view mirror assembly for a motor vehicle, said rear view mirror assembly comprising:
    a mirror base fixedly secured to the motor vehicle;
    a mirror support pivotably connected to said mirror base, said mirror support including an attachment formed integrally therein;
    a female connector secured to said attachment of said mirror support via a detachable snap connection;
    a mirror housing fixedly secured to said mirror support;
    an electrical lighting device secured to said mirror housing, said electrical lighting device electrically connected with the motor vehicle, said electrical lighting device having a conical structure for receiving said female connector therein, said conical structure surrounding connector pins that are received by said female connector;
    wherein said female connector is movable relative to said attachment of said mirror support to ease connection of said electrical lighting device to said mirror support.

2. A rear view mirror assembly according claim 1 wherein said attachment includes arms having hooks formed in an inner surface of said arms to hold said female connector.

3. A rear view mirror assembly according claim 1 wherein said attachment has at least one recess to fix said female connector thereto.

4. A rear view mirror assembly according claim 3 wherein said recess fits to a lug of said female connector.

5. A rear view mirror assembly according claim 1 wherein said electrical lighting device has parallel pins that are installed through at least a portion of said electrical lighting device.

6. A rear view mirror assembly according claim 5 wherein said parallel pins of said electrical lighting device are electrically connected to a printed circuit board installed in said electrical lighting device.

7. A rear view mirror assembly according claim 1 wherein said conical structure forms a conical opening with an angle of 70°+/−3°.

\* \* \* \* \*